United States Patent [19]

Hodge et al.

[11] Patent Number: 5,034,846
[45] Date of Patent: Jul. 23, 1991

[54] PLUG PROTECTOR

[75] Inventors: Donald E. Hodge, R.R. 8, Box 139, Shelbyville, Ind. 46176; Raymond A. Loturco, Columbus, Ind.

[73] Assignee: Donald E. Hodge, Shelbyville, Ind.

[21] Appl. No.: 405,645

[22] Filed: Sep. 11, 1989

[51] Int. Cl.[5] .............................................. H02H 3/20
[52] U.S. Cl. .................................... 361/119; 361/394; 361/399; 439/620; 439/622; 379/331
[58] Field of Search ............... 361/117, 118, 119, 294, 361/297, 399, 411; 219/331; 439/299, 324, 620, 621, 622

[56] References Cited

U.S. PATENT DOCUMENTS

| 1,107,318 | 8/1914 | Kuhn | 429/453 |
|---|---|---|---|
| 1,876,695 | 9/1932 | Kuhn et al. | 455/343 |
| 2,504,804 | 4/1950 | Clarke | 361/119 |
| 4,021,759 | 5/1977 | Campi | 361/119 |
| 4,233,641 | 11/1980 | Baumbach | 361/119 |
| 4,239,319 | 12/1980 | Gladd et al. | 439/620 |
| 4,262,317 | 4/1981 | Baumbach | 361/119 X |
| 4,438,477 | 3/1984 | Cawley | 361/119 |
| 4,573,100 | 2/1986 | Fasano | 361/119 |
| 4,594,635 | 6/1986 | Scheithauer et al. | 361/119 |
| 4,633,360 | 12/1986 | Mickelson | 361/119 |
| 4,758,921 | 7/1988 | Hung | 361/119 |

FOREIGN PATENT DOCUMENTS 119950 9/1984 European Pat. Off. .
101057 5/1986 Japan .

OTHER PUBLICATIONS

"An Electrical Component Package," R. A. Applegate, B. A. Whittman, Western Electric Technical Digest No. 64 (Oct. 1981).
Texas Instruments Data Sheet for the TISP2180, TISP2290 Dual Symmetrical Transient Voltage Suppressors, D3201, Dec. 1987.
12A Solid-State Olvervoltage Protector Unit From Northern Telecom, Cook Electric Division, Marketing Bulletin, Feb. 12, 1988.

Primary Examiner—Derek S. Jennings
Attorney, Agent, or Firm—Barnes & Thornburg

[57] ABSTRACT

A terminal connector or plug protector is selectively configurable for coupling or coupling and protecting an electronic communication circuit to a communication line. The plug protector has a housing and a circuit board which is received in the housing. The circuit board has thereon a circuit which includes a plurality of circuit elements removably received in the circuit board. The circuit is coupled to the communication circuit and to the communication line with the circuit elements coupled therebetween. The circuit elements are selected from among a plurality of circuit element types, i.e., jumper wires, solid state voltage suppressors, and fuses, to configure the plug protector for the selected coupling or coupling and protecting.

26 Claims, 5 Drawing Sheets

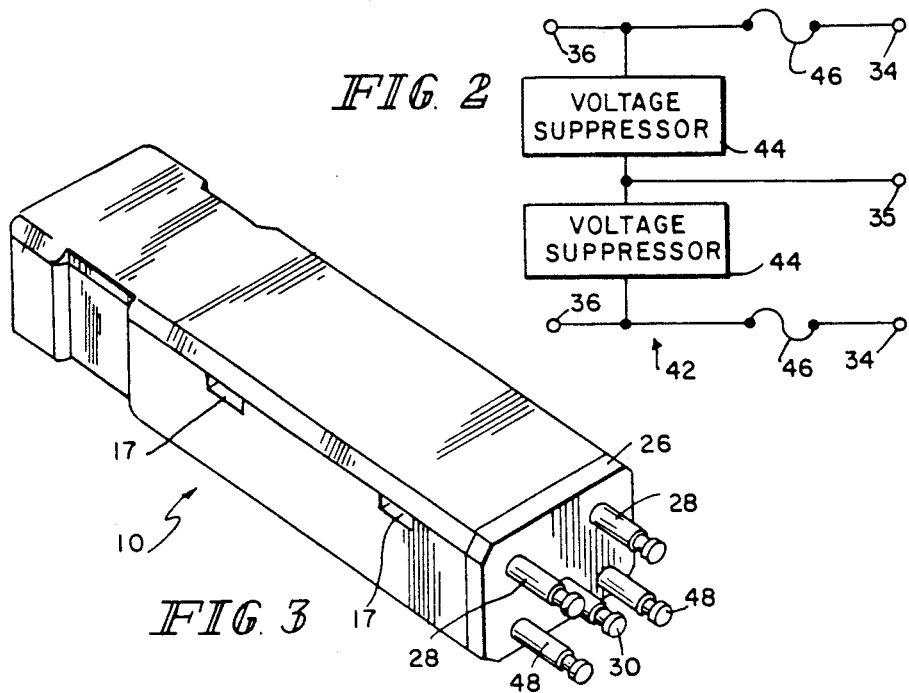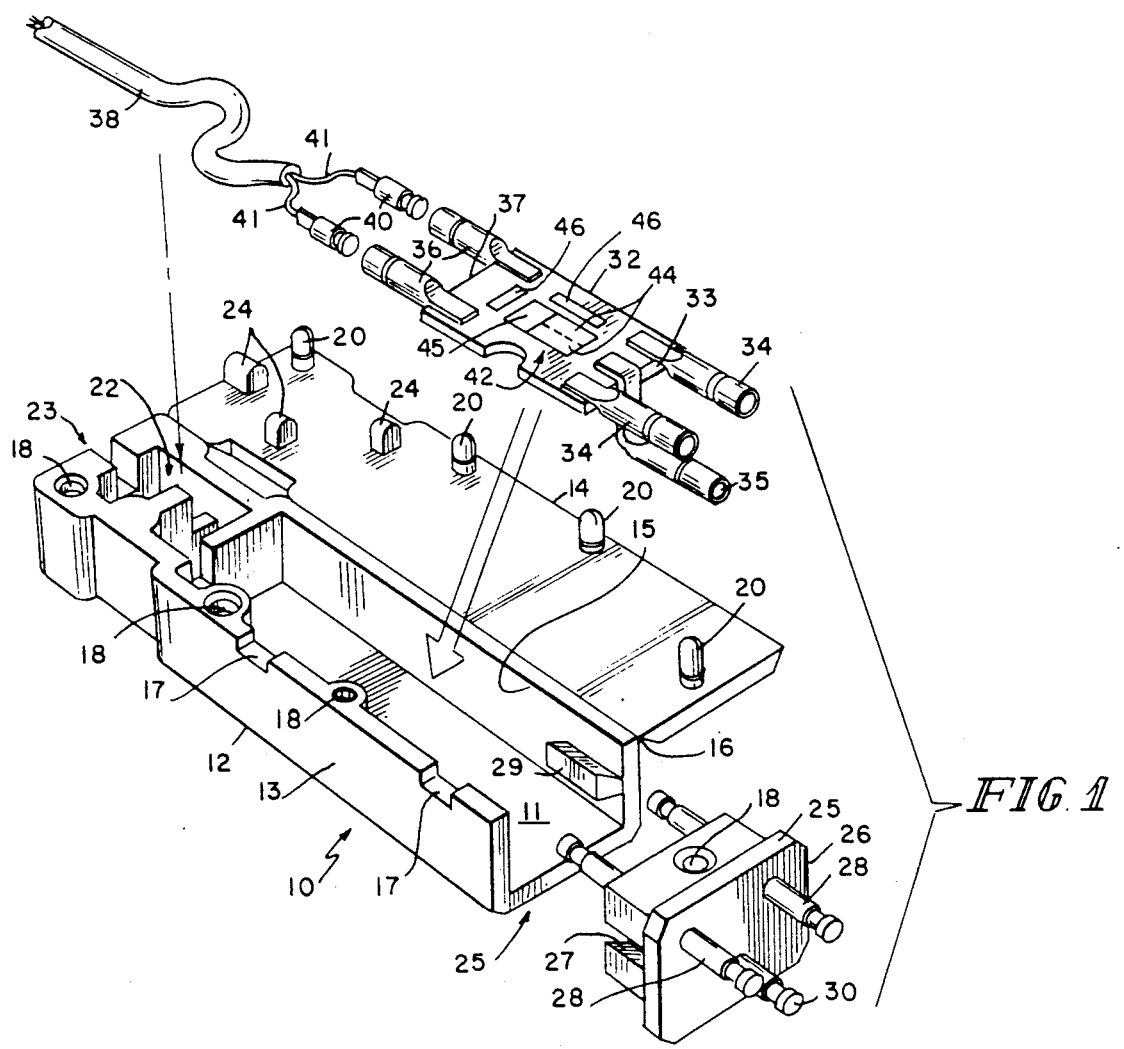

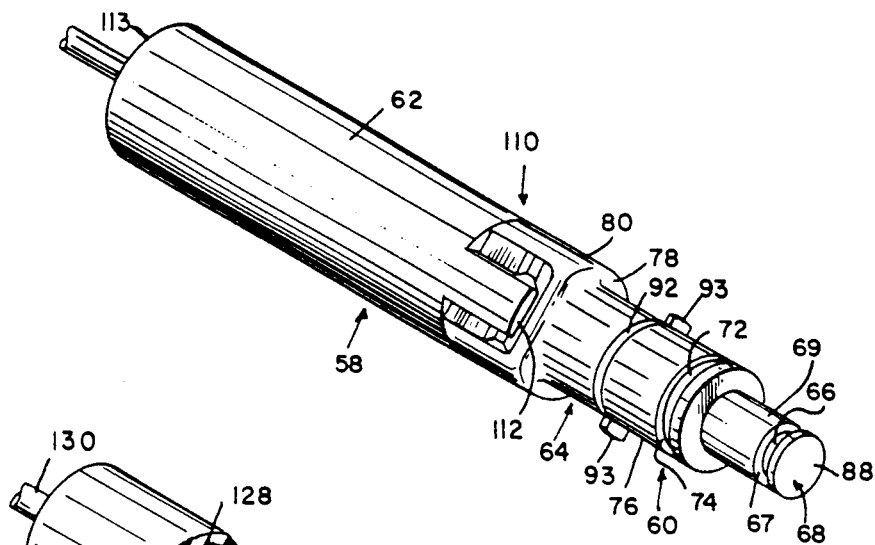
FIG. 4
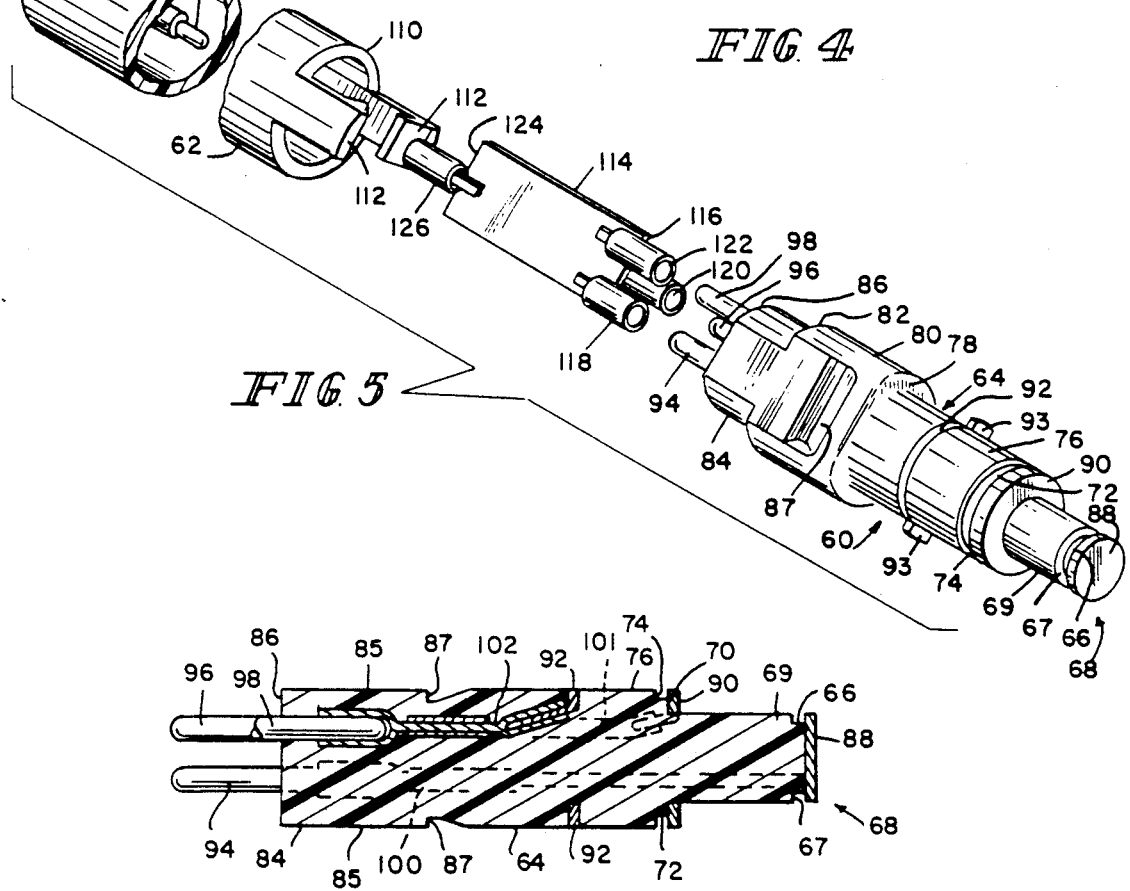
FIG. 5
FIG. 6

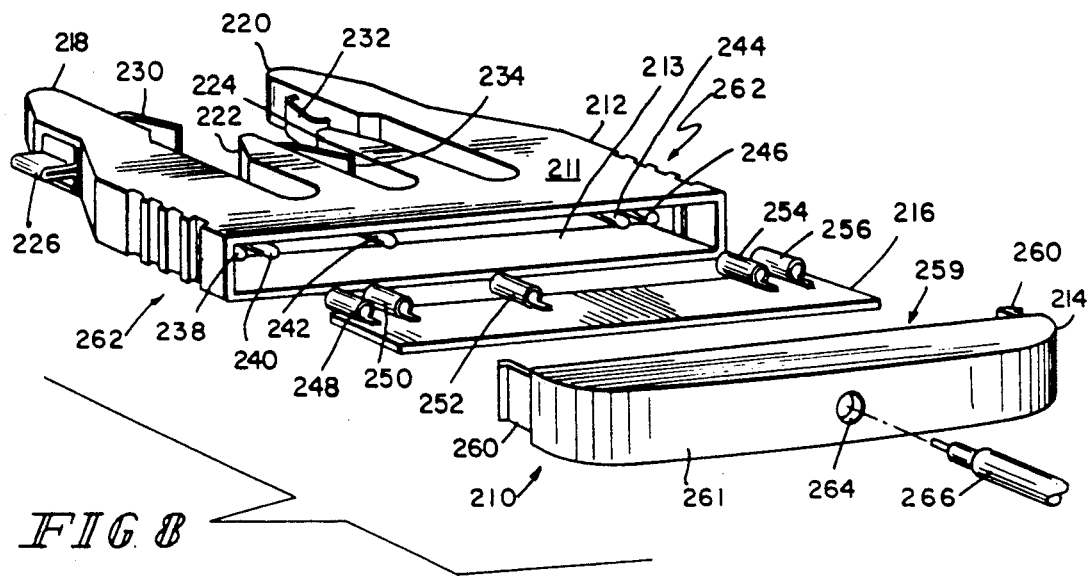
FIG. 8
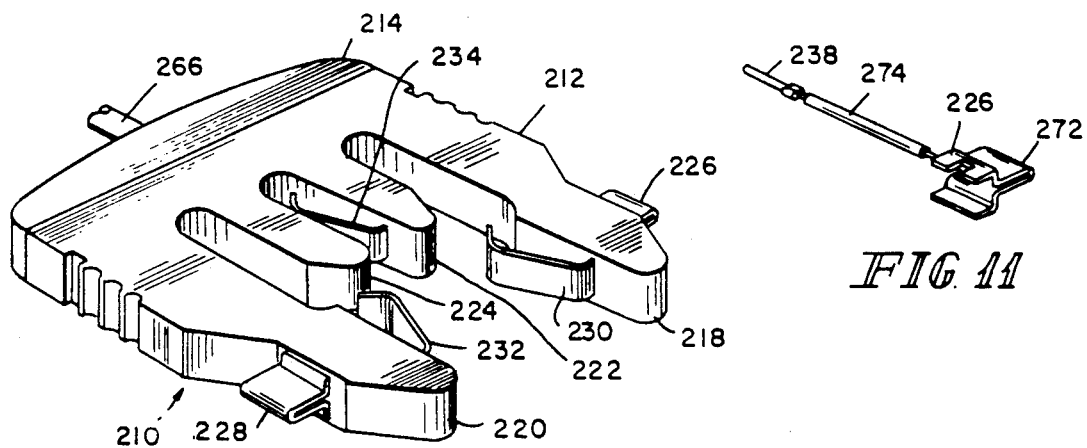
FIG. 9
FIG. 11
FIG. 12

PLUG PROTECTOR

This invention relates to terminal connectors for use in telecommunication systems, particularly, plug protectors which plug into the frame at a switch office to couple a communication line to a communication circuit and provide electrical protection against voltage and current overloads.

A switching office for a telecommunications systems such as a telephone system will typically have a frame and a switch. The frame can best be thought of as a large patch or cross connect panel where communication lines are connected to communication circuits in the switch, usually by a plug protector type of terminal connector. For the purposes of this application, "communication line" means the field wiring, i.e., the connection between the frame and a telecommunication device located in the field such as a subscriber's telephone. Conventionally, the communication line has a pair of wires or cable pair, i.e., tip and ring, which couple the field device, i.e., telephone, to a pair of frame terminals. The communication circuit to which the communication line is coupled conventionally consists of tip and ring circuits in the switch which are also terminated at a pair of frame terminals. A ground terminal is provided on the frame for each communication line and associated communication circuit.

A terminal protector such as a plug protector is used to couple the communication line to its associated communication circuit. The model of frame at which the communication line and communication circuit are terminated determines the type of plug protector used. There are three types of frames currently in widespread use. The frame models manufactured by Western Electric for these frame types are the C-50 model frame, the 300 model frame and the 303 model frame. For convenience, the three frame types will be referred to by their corresponding Western Electric model number. The 303 type frame is the most recently developed frame and is typically the only frame used for new installations. The other two frame types are essentially obsolete and are gradually being phased out as equipment in switching offices is replaced. However, there is still a large installed base of these two frame types.

The first two above described frame types are configured such that two plug protectors are typically required to couple one of the tip and ring wires of communication line to the respective tip or ring circuit. That is, one plug protector is required to couple the tip circuit to the respective tip wire of the communication line and one plug protector is required to couple the ring circuit to the respective ring wire of the communication line. In contrast, the 303 type frame is configured such that only one plug protector is typically needed to couple the tip and ring circuits of the communication circuit to the respective wires of the communication line.

The plug protector will normally have electrical protection elements which protect the communication circuits of the switch from voltage and current overloads which may come in over the communication line, such as might be caused by a lightning strike. In many cases, this will include current overload protection elements coupled in series between the associated terminals of the communication line and the communication circuit and voltage suppression elements coupled between the tip and ring circuits and ground, respectively. The plug protector will have a ground terminal which mates with the ground terminal provided on the frame to provide a ground.

Heretofore, the most common type of plug protectors have used either carbon block or gas tube voltage suppressors to provide voltage overload protection and heat coils to provide current overload protection. Such a plug protector configured for use with a 303 type frame is described in U.S. Pat. No. 4,594,635. The heat coils, in addition to providing over-current protection, connect the respective carbon blocks or gas tubes to the appropriate terminals in the base of the plug protector. The heat coils are springs and the spring force exerted by the heat coils ensures that they remain electrically connected to the voltage protection elements and the base terminal connections.

Recently, a solid state voltage suppressor element has been substituted for the carbon block or gas tube voltage suppression elements in a plug protector. Such a plug protector is the model 12 A solid state overvoltage protector unit manufactured by the Cook Electric Division of Northern Telecom, Inc. However, in this device, the solid state voltage suppression is packaged to resemble a carbon block or gas tube voltage suppressor and is simply substituted for the carbon block or gas tube suppressor. The heat coil arrangement is still used to provide over-current protection.

A problem with the heat coil arrangement is that it is difficult to disassemble. The spring force exerted by the heat coils requires an appropriate mechanical package for keeping all the elements in place. This usually includes a base which is snapped into the housing which also holds the protection elements. When the base is removed, the spring force exerted by the heat coils tends to cause the various protection elements to spring out. This makes it difficult to replace the protection elements after they have blown due to an overload.

One problem that arises in phone systems occurs when the cable pair that connects a subscriber to the frame in a switching office becomes defective. When this happens, the subscriber must be switched to a new cable pair, the switch's data base updated to reflect this change, and the wiring for the subscriber which connects the switch's communication circuit to the frame also changed. Normally, the frame is configured so that the terminals at which the communication line wires are terminated are adjacent the terminals at which the corresponding tip and ring circuits are terminated. However, when the cable pair connecting a subscriber to the frame is changed, this will no longer be the case. The data base in the switch must then be updated to reflect this change and the wiring connecting the tip and ring circuits to the frame also changed so that they will now be terminated adjacent the terminals on the frame at which the new cable pair is terminated. This usually takes some time and the repair person who is out in the field changing the subscriber's cable pair cannot leave until the new cable pair has been shown to work satisfactorily. Therefore, it has been found that it is advantageous to use a patch cord to bridge between the frame terminals at which the old cable pair is terminated and the frame terminals at which the new cable pair is terminated.

A problem that can occur with plug protectors is that one with the desired type of electrical protection may not be readily available. Depending upon the particular communication line, no electrical protection may be needed, only voltage overload protection may be needed, only current overload protection may be needed, or both voltage and current overload protection may be needed. For example, if the communication line is an internal one, that is, wholly contained within the building where the switch is located, it may be possible to dispense with the electrical protection provided by the plug protector and use it simply to connect the communication line to the communication circuit. Alternatively, if the communication line is an external one, such as a subscriber phone line, the potential exposure to lightning strikes, inadvertent contact with power lines or the possibility of inductive coupling between it and a power line requires that the plug protector provide both overvoltage and overcurrent protection. Further, newer switches frequently include overvoltage protection for their communication circuits, obviating the need for overvoltage protection elements in the plug protector, whereas older switches do not. However, the above described plug protector construction makes it difficult to modify such a plug protector to change the type of protection it provides.

Another problem faced by plug protectors of the type described above which are used with the 303 type frame is that is difficult to change the terminal configuration that their bases have. When terminal connectors are used for patch cords, the terminal configuration of the bases of the terminal connectors must match the terminal configuration of the frame for either the communication circuit or the communication line. In many cases, it is desirable to provide a ground terminal regardless of whether the terminal connector is to connect with the communication line terminals or with the communication circuit terminals. Further, extensions are sometimes needed for the patch cords. Such extensions typically require that the terminal connectors on either end have terminal sockets as opposed to the terminal pins which the terminal connectors typically have.

It is an objective of this invention to provide a terminal connector which can be easily modified to change the type of electrical protection it provides.

It is another objective of this invention to provide a terminal connector for use with the 303 type frame that has easily changed bases to permit the terminal configuration of the terminal connector to be easily changed.

A terminal connector according to this invention is selectively configurable to provide varying degrees of electrical protection. It has a housing with a circuit board received in the housing which has a circuit thereon. The circuit has removable circuit elements which are selectable from a plurality of circuit element types such as solid state voltage suppressors, current overload protection elements and jumpers so that the type of electrical protection provided by the terminal connector is determined by the type of circuit elements received in the circuit board.

The housing for a terminal connector for use with a 303 type frame also has a base which is removably coupled to it. The base has terminals extending therefrom which mate with the frame terminals of a communication circuit, the frame terminals of a communication line, or both. The base is selectable from a plurality of bases having different configurations of terminals extending therefrom to permit the terminal configuration of the terminal connector to be selected to mate with the desired frame terminals for the communication circuit, communication line, or both. Also, the base can be selected from bases having terminal socket pins extending therefrom.

The housing can also have a cover which snaps open and closed to permit easy access to the circuit board. Also, for terminal connector for use with the 303 type frame, the housing can secure the removable base to the housing when closed wherein the base is freely removable from the housing when the cover is open. This permits the base to be easily changed. The terminal connector can also include a hinge for mounting the cover to the housing. In an embodiment, the hinge is a living hinge and the housing, cover and hinge are a one-piece molded unit.

Additional features and advantages of the invention will become apparent to those skilled in the art upon consideration of the following detailed description of a preferred embodiment, exemplifying the best mode of carrying out the invention as presently perceived. The detailed description particularly refers to the accompanying figures in which:

FIG. 1 is an exploded perspective view of a terminal connector for use with the 303 type frame constructed according to this invention;

FIG. 2 is a schematic of a circuit for the terminal connector of FIG. 1;

FIG. 3 is a perspective view of an assembled terminal connector of for use with the 303 type frame constructed according to this invention;

FIG. 4 is a is a perspective view of an assembled terminal connector for use with a 300 type frame constructed according to this invention;

FIG. 5 is an exploded perspective view of the terminal connector of FIG. 4;

FIG. 6 is a cross section of a connector end of the terminal connector of FIGS. 4 and 5 taken along line 5—5 of FIG. 5;

FIG. 8 is an exploded perspective view of a terminal connector for use with the C-50 type frame constructed according to this invention;

FIG. 9 is a perspective view of the terminal connector of FIG. 8 assembled;

FIG. 11 is a perspective view of a post contact coupled to a terminal pin used in the terminal connector of FIGS. 8 and 9;

FIG. 12 is a perspective view of a spring contact coupled to a terminal pin used in the terminal connector of FIGS. 8 and 9;

Figure 7:
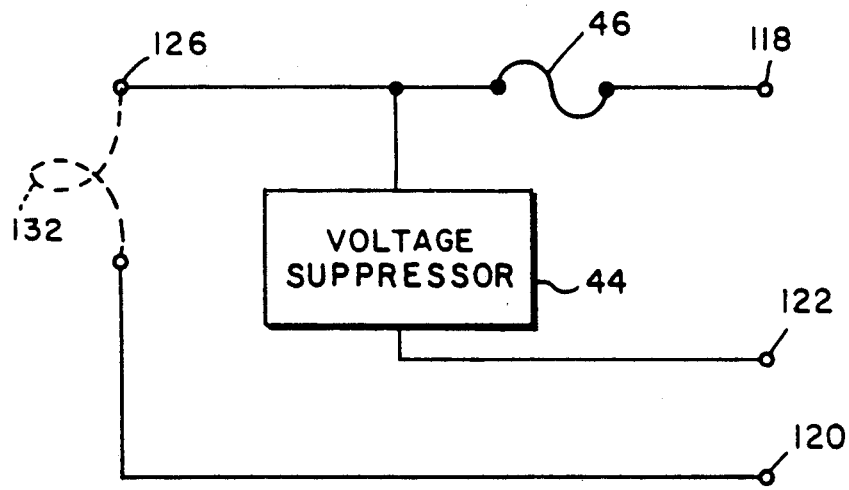
FIG. 7 is a schematic of a circuit for the terminal connectors of FIGS. 4–6.

Referring to FIGS. 1 and 2, a terminal connector or plug protector 10 constructed according to this invention for use with the 303 type frame is shown. Plug protector 10 has a generally rectangular housing 12 which has a bottom wall 11, sidewalls 13 and 15, and a cover 14. Cover 14 is preferably attached to housing 12 by a living hinge 16. Sidewall 13 includes lock post cavities 18 and cover 14 has lock posts 20 extending therefrom. Lock posts 20 are received in lock post cavities 18 and snap into place therein to secure cover 14 in place when cover 14 is in a closed position as shown in FIG. 3. Sidewall 13 has, at an upper edge, a plurality of spaced apart slots 17 formed therein for facilitating opening cover 14.

Housing 12 further includes a wire trap 22 disposed therein at a first end 23 of housing 12. Cover 14 has pressure tabs 24 extending therefrom which, when cover 14 is in its closed position, coact with wire trap 22 to hold a wire or cable 38 in place.

Figure 17:
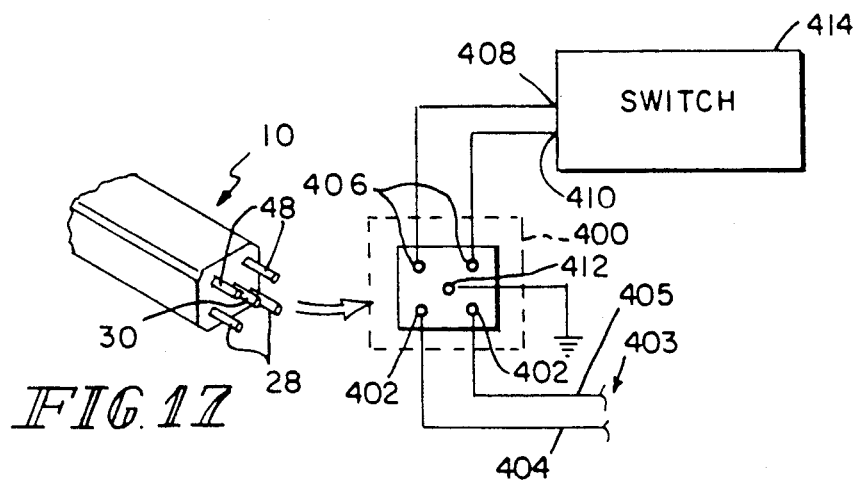
FIG. 17 is a diagrammatic view of a terminal block of a frame coupled to tip and ring circuits in a switch and to tip and ring wires of a communication line.

Plug protector 10 further includes a base 26 which is removably mounted to housing 12 at a second or base end 25 of housing 12. Base 26 includes two terminal pins 28 and a ground pin 30 extending therefrom. Terminal pins 28 and ground pin 30 mate with associated socket pins of frame 400 (FIG. 17) into which plug protector 10 is inserted.

Sidewalls 13 and 15 of housing 12 have on inner surfaces thereof longitudinally extending dovetail mounting tabs 29 at the base end 25 of housing 12. Base 26 includes corresponding longitudinally mounting slots 27 and also includes in its top a lock post cavity 18. Cover 14 has a corresponding lock post 20 extending therefrom. When base 26 is mounted to housing 12 it is inserted into the base end 25 of housing 12 and mounting slots 27 slide over mounting tabs 29. Cover 14 is then closed and the lock posts 20 are inserted into the lock post cavities 18 in the housing 12 and the base 26. Base 26 is thus held in place by the coaction of mounting slots 27 with mounting tabs 29 and the coaction of the lock post cavity 18 in the top of base 26 with the corresponding lock post 20 extending from cover 14.

Plug protector 10 also includes a circuit board 32 which is mounted in housing 12. Circuit board 32 has a circuit 42 thereon which couples the communication line 403 (FIG. 17) to a communication circuit of a switch 404 as will be explained in more detail later. Circuit board 32 includes a pair of terminal socket pins 34 and a ground pin 35 extending outwardly from a first or base end 33 of circuit board 32. Terminal socket pins 34 and ground pin 35 mate with terminal pins 28 and ground pin 30, respectively, of base 26 when base 26 and circuit board 32 are both mounted in housing 12. Circuit board 32 also has terminal socket pins 36 extending outwardly from a second end 37 thereof. Terminal socket pins 36 mate with terminal pins 40 of wire or cable 38 which are connected to the ends of conductors 41 of wire or cable 38.

In the embodiment of FIG. 1, protector plug 10 is configured to be one end of a patch cord, illustratively, the end which couples to the terminals of the frame at which the communication line wires are terminated. Thus, base 26 is configured to have three pins extending therefrom, i.e., terminal pins 28 and ground pin 30. The other end of wire 38 would terminate at another protector plug 10 which would have a base 26 configured to mate with the terminals of the frame at which the tip and ring circuits of the communication circuit are terminated.

FIG. 2 is a schematic of the circuit 42 of the circuit board 32 of FIG. 1. Circuit 42 includes voltage supPressors 44 coupled between respective terminal socket pins 36 of circuit board 32 and the ground pin 35 of circuit board 32. Illustratively, voltage suppressors 44 are mounted on circuit board 32 with a heat sink 45 affixed to voltage suppressors 44 in conventional fashion. Circuit 42 also includes fuses 46 which are coupled in series between terminal socket pins 34 and terminal socket pins 36 of circuit board 36. When circuit 42 is used on circuit board 32 of plug protector 10, plug protector 10 provides both overcurrent and overvoltage protection. A voltage suppressor 44 and the fuse 46 to which it is connected illustratively comprise a leg of circuit 42 for coupling and protecting a tip or ring circuit to the tip or ring wire, respectively. Voltage suppressors 44 can illustratively be TISP2180 or TISP2290 Dual Symmetric Transient Voltage Suppressors manufactured by Texas Instruments, Dallas, Texas. Fuses 46 can illustratively be Microtron® type miniature fuses manufactured by Bussman, P.O. Box 14460, St. Louis, Missouri 63178.

Fuses 46 and voltage suppressors 44 are removably received in circuit board 32. Illustratively, they are soldered in place and can be removed by unsoldering them. Alternatively, sockets could be provided on circuit board 32 to receive them. Circuit board 32 can be configured to provide both overvoltage and overcurrent protection, only overvoltage protection, only overcurrent protection, or no protection at all by insertion of the appropriate voltage suppressors 44, fuses 46 or jumper wires in circuit board 32. For example, if only overcurrent protection is desired, the voltage suppressors 44 would be removed from the circuit 42. If only overvoltage protection was desired, the fuses 46 would be removed from the circuit of 42 and replaced with jumper wires. If no protection was desired, both the voltage suppressors 44 and the fuses 46 would be removed from the circuit 42 and the fuses 46 replaced with jumper wires.

As has been mentioned, base 26 is removably mounted in housing 12. This permits an appropriately configured base 26 to be mounted in housing 12 to achieve the desired function. For example, the plug protector 10 could be configured with the base 26 shown in FIG. 1 to be one end of a patch cord which mates with the terminals to which the wires of the communication line are terminated. Alternatively, the plug protector 10 could be configured with a base 26 which mates with the terminals to which the tips and ring circuits of the communication circuit are terminated. The plug protector 10 could also be configured with a base 26 to be one end of an extension cord. In this instance, the terminal pins 28 and 30 would be replaced with terminal socket pins. Plug protector could also be configured with a base 26 which would mate with both the terminals to which the wires of the communication circuit are terminated and the terminals at which the tips and ring circuit of the communication circuit are terminated. This, in fact, would be the most often used configuration since plug protectors are most commonly used to connect adjacently located communication line and communication circuit frame terminals.

FIG. 3 shows a plug protector 10 wherein its base 26 is configures so that plug protector 10 will couple 402 (FIG. 17) terminals in the frame 400 to which the tip wire 404 and ring wire 405 of communication line 403 wires of are terminated to adjacently located terminals 406 in the frame 400 to which the tip and ring circuits 408, 410, respectively of the communication circuit are terminated. As has been discussed, this would be the most common use of a plug protector such as plug protector 10. The plug protector 10 of FIG. 3 is shown assembled with base 26 mounted in housing 12 and cover 14 closed. The base 26 in addition to two terminal pins 28 and ground pin 30 also has two terminal pins 48. Terminal pins 28 will mate with the terminals in the frame 400 to which the wires 404, 405 of the communication line 403 are terminated, ground pin 30 will mate with a ground pin 412 in the frame 400 associated with the communication line and its associated communication circuit, and terminal pins 48 will mate with the terminals 406 in the frame 400 to which the tip and ring circuits 408, 410 of the communication circuit are terminated. Also, terminal socket pins 36 of circuit board 32 will be connected to terminal pins 48 such as by appropriate placement of terminal socket pins 36 on circuit board 32 so that they mate with terminal pins 48 when base 26 in mounted in housing 12. Alternatively, lengths of wire can be used to connect terminal socket pins 38 to terminal pins 48.

Figure 13:
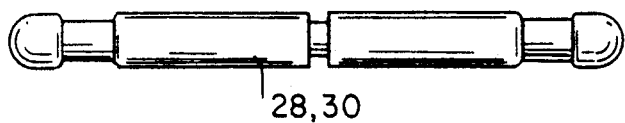
FIG. 13 is a side perspective view of a terminal pin used in the terminal connectors of FIGS. 1 and 3.
Figure 14:
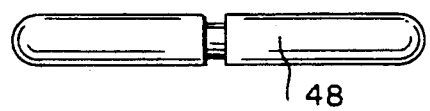
FIG. 14 is a side perspective view of a different terminal pin used in the terminal connectors of FIGS. 1 and 3.
Figure 15:
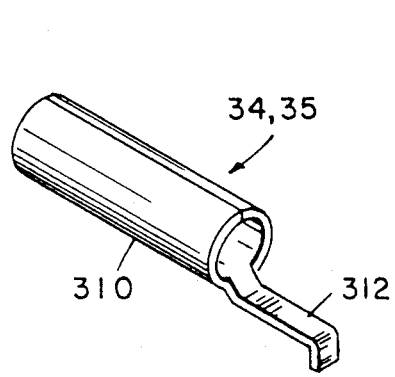
FIG. 15 is a perspective view of a terminal socket pin used in the terminal connectors of FIGS. 1 and 3.
Figure 16:
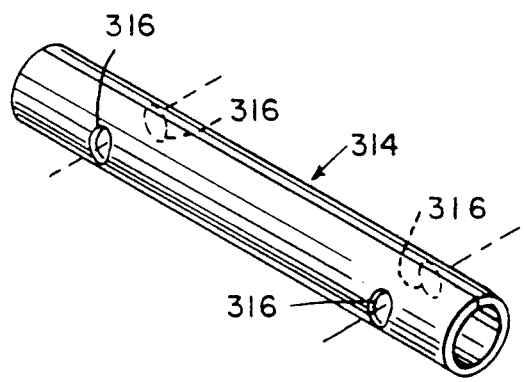
FIG. 16 is a perspective view of a terminal socket pin which can be substituted for the terminal pin of FIG. 13.

Terminal pins 28 and terminal pin 30 are illustratively formed on a screw machine of 0.0937 O.D. brass rod in the shape shown in FIG. 13. Terminal pins 28 are illustratively plated with gold over nickel and terminal pin 30 plated with tin. Terminal pins 48 also are illustratively formed on a screw machine of 0.0937 O.D. brass rod in the shape shown in FIG. 14 and are illustratively plated with gold over nickel. Terminal socket pins 34 and 35 can illustratively be stamped and roll formed from 0.0142 GA. phosphor bronze in the shape shown in FIG. 15 to have a hollow cylinder 310 with a flanged finger 312 extending from one end thereof. Each end of cylinder 310 is coined and flared. Terminal socket pins 34 are illustratively finished by plating with gold over nickel and terminal pin 35 finished by plating with tin. Terminal socket pins 36 and 37 can preferably be be Amp Barrel terminals manufactured by Amp, Inc., Harrisburg, Pennsylvania, or alternatively, be identical to terminal socket pins 34 as shown in FIG. 1. The terminal socket pins which can be substituted for the terminal pins 28 and 30 in base 26 can illustratively be roll formed from 0.0142 GA. phosphor bronze to a hollow cylinder 314 as shown in FIG. 16. Each end of cylinder 314 is coined and flared and a hole 316 extends transversely through cylinder 312 adjacent each end of cylinder 312. The terminal socket pins which are substituted for terminal pins 28 are illustratively plated with gold over nickel and the terminal socket pin which is substituted for ground pin 30 is tin plated.

Referring to FIGS. 4–6, a terminal connector or plug protector 58 constructed for use with a 300 type frame is shown. Plug protector 58 includes a cylindrically shaped connector head 60 which mates with a cylindrically shaped connector body or barrel 62. Connector head 60 comprises a one-piece injection molded plastic body 64. A cylindrical section 66 extends rearwardly from a first or front end 68 of body 64 to a radially outwardly extending, frontwardly facing annular shoulder 67. A cylindrical section 69 extends rearwardly from annular shoulder 67 to a radially outwardlY extending, frontwardly facing annular shoulder 70. A cylindrical section 72 extends rearwardly from annular shoulder 70 to a radially outwardly extending, frontwardly facing annular shoulder 74. A cylindrical section 76 extends rearwardly from annular shoulder 74 to an outwardly extending, frontwardly facing tapered annular shoulder 78. A cylindrical section 80 extends rearwardly from annular shoulder 78 to an inwardly extending, rearwardly facing annular shoulder 82. A cylindrical section 84 extends rearwardly from annular shoulder 82 to a rear end 86 of body 64. Diametrically opposed surfaces of cylindrical section 84 and cylindrical section 80 are flattened and the flattened portion of cylindrical section 80 includes notches 87 for securing connector head 60 to connector body 62 as will be described more fully later.

Connector head 60 also includes a disk shaped terminal 88 affixed to the tip of the front end 68 of body 64, annular terminal 90 affixed at the front face of annular shoulder 70, and an annular terminal 92 affixed in cylindrical section 76 between annular shoulder 74 and annular shoulder 78. Annular terminal 92 has opposed radially outwardly extending terminal tabs 93. Terminals 88, 90 and 92 are all insert molded in body 64 when body 64 is formed. Connector head 60 also includes terminal pins 94, 96 and 98 extending rearwardly from the rear end 86 of body 64. Terminal pin 94 is connected by a connector strip 100 to disk shaped terminal 88, terminal pin 96 is connected by a connector strip 101 to the first annular terminal 90, and terminal pin 98 is connected by a connector strip 102 to second annular terminal 92. Illustratively, the connector strips 100, 101, 102 are also insert molded in body 64 when body 64 is formed.

When the plug protector 58 is inserted into a frame socket, annular terminal 90 will contact the frame terminal to which a wire of the communication line is terminated, disk terminal 88 will contact the frame terminal to which the tip or ring circuit associated with the wire of the communication circuit is terminated, and terminal tabs 93 of second annular terminal 92 will contact a frame ground terminal.

Connector body 62 also is a one-piece injection molded plastic part. Connector body 62 has a front end 110 from which two diametrically opposed fingers 112 extend axially therefrom. Fingers 112 snap into notches 87 in body 64 of connector head 60 to secure connector head 60 and connector body 62 together. Connector body 62 also has a rear end 113. When plug protector 58 is used as one end of a patch cord, the rear end 113 of connector body 62 will have an opening (not shown) therein to permit a wire 130 to pass into plug protector 58 and connector body 62 will also have a crimp-on wire restraint (not shown) disposed therein generally at rear end 113 of connector body 62. If plug protector 58 is used only as a conventional plug protector, the rear end 113 of connector body 62 would be closed.

Plug protector 58 also includes a circuit board 114. Circuit board 114 has, affixed to a front end 116, terminal socket pins 118, 120, 122, and, affixed to a rear end 124, a terminal socket pin 126. Terminal socket pins 118, 120, 122 mate with terminal pins 94, 96, 98, respectively, of connector head 60 and, in addition to providing electrical connections, also act to hold circuit board 114 in place within plug protector 58.

When plug protector 58 is used as one end of a patch cord, terminal socket pin 126 mates with a terminal pin 128 connected to the end of a wire 130. The other end of wire 130 will illustratively be connected directly to terminal 88 or to annular terminal 90 of a second plug protector 58 to make the patch cord. Illustratively, the first plug protector 58 of a patch cord is inserted in the frame socket for the "inside wiring," i.e., the frame socket to which the desired tip or ring circuit of the communication circuit is terminated. The second plug protector 58 is inserted in the frame socket at which the desired one of the two wires of the communication line to be patched to the corresponding desired tip or ring circuit is terminated. The first plug protector or "inside wiring" plug protector will contain an appropriately configured circuit board 114 whereas the second plug protector will not since the circuit board 114 of the first plug protector 58 will provide the requisite electrical protection. Alternately, when plug protector 58 is used as a conventional plug protector, terminal socket pin 126 will be connected, such as by a jumper wire 132 (FIG. 7), to terminal socket pin 120.

Circuit board 114 includes a circuit 134 (FIG. 7) which couples the tip or ring circuit of the communication circuit to the corresponding wire of the communication line and which can be configured to provide the desired type of electrical protection and to configure the plug protector for use as the end of a patch cord or for use as a conventional plug protector. The circuit elements used in circuit 134 are identical to the circuit elements used in circuit 42 of FIG. 3 so the same numbers used in FIG. 3 to identify the circuit elements of circuit 42 will be used to identify the circuit elements of circuit 134. Referring to FIG. 7, circuit 134 includes a fuse 46 and a voltage suppressor 44. Fuse 46 has one terminal coupled to terminal socket pin 118 and a second terminal coupled to a first terminal of a voltage suppressor 44 and to terminal socket pin 126. As discussed previously, terminal socket pin 118 is coupled to one of the tip or ring circuits of the communication circuit through terminal pin 94 and disk terminal 88 of connector head 60. A second terminal of voltage suppressor 44 is coupled to terminal socket pin 122 which, as discussed previously, is coupled to a frame ground terminal through terminal pin 98 and second annular terminal 92 of connector head 60.

Circuit 134 is configured to provide the desired type of electrical protection in the same manner that circuit 42 of FIG. 3 is configured to provide the desired type of electrical protection. That is, if both current and voltage overload protection are desired, circuit 134 will have both fuse 46 and voltage suppressor 44. If only current overload protection is desired, circuit 134 will be configured to have only fuse 46 and voltage suppressor 44 will be removed. If only voltage overload protection is desired, circuit 134 will be configured to have only voltage suppressor 44 and fuse 46 will be replaced with a jumper wire. Also, when the plug protector 58 is to be used as a conventional plug protector, i.e., couple the communication circuit terminated at the frame socket to which plug protector 58 is inserted to the corresponding wire of the communication line terminated at the same frame socket, jumper wire 132 is inserted in circuit 134 to connect terminal socket pin 120 to the second terminal of fuse 46. If the plug protector 58 is to be used as one end of a patch cord, jumper wire 132 is removed. Similar to circuit 42, the circuit elements of circuit 134 are removably received in circuit board 114.

Referring to FIGS. 8 and 9, a plug protector 210 for use with the C-50 type frame is shown. Plug protector 210 includes a body 212, a cover 214 and a circuit board 216 which is removably received within the body 212 of plug protector 210. Body 212 is illustratively a molded, somewhat U-shaped shell, molded from a suitable plastic such as polyester varox #420/30% glass reinforced. The bight 211 of U-shaped body 212 has an elongated rectangular opening 213. A pair of outer legs 218, 220 extend outwardly from opposite side of the bight 211 of U-shaped body 212. A pair of inner legs 222, 224 also extend outwardly from the bight 211 of U-shaped body 212 between outer legs 218, 220. Each of outer legs 218, 220 has, at distal ends thereof, outwardly extending post contacts 226, 228, and inwardly extending spring contacts 230, 232, respectively. One of the inner legs 222, 224, illustratively, inner leg 222, has at a distal end thereof an inwardly extending spring contact 234. Post contact 226 is connected to a terminal pin 238, spring contact 230 is connected to a terminal pin 240, spring contact 234 is connected to a terminal pin 242, spring contact 232 is connected to a terminal pin 244, and post contact 228 is connected to a terminal pin 246.

Circuit board 216 includes terminal socket pins 248, 250, 252, 254 and 256 extending from an inwardly facing side thereof. Terminal socket pins 248, 250, 252, 254 and 256 mate with terminal pins 238, 240, 242, 244 and 246, respectively. Terminal pins 238, 240, 242, 244, 246, and terminal socket pins 248, 250, 252, 254 and 256 can be any conventional terminal pins or sockets made for use on printed circuit boards.

Figure 10:
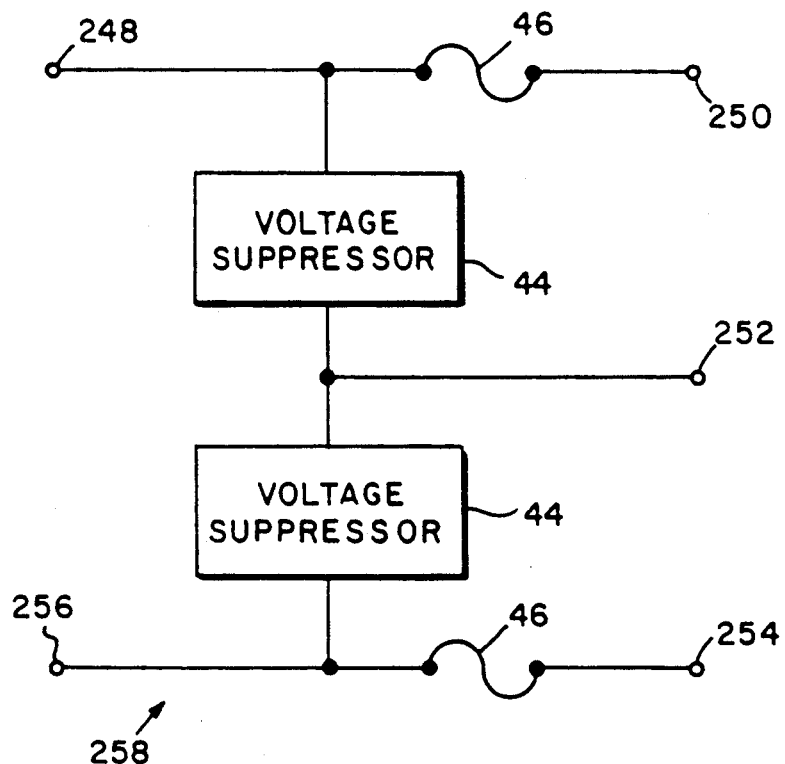
FIG. 10 is a schematic of a circuit for the terminal connector of FIGS. 8 and 9.

Circuit board 216 has thereon a circuit 258 (FIG. 10) for coupling the communication line to the communication circuit in the same way that has been discussed previously. This circuit is schematically identical to circuit 42 of FIG. 2 and uses the same components. The numbers used to reference the components of circuit 42 of FIG. 2 will be used to reference the same components of FIG. 10. Terminal socket pins 248 and 256 are coupled to first terminals of respective voltage suppressors 44. Second terminals of the voltage suppressors 44 are coupled to terminal socket pin 252 which provides a ground for circuit 258. Terminal socket pins 248 and 256 are also coupled through respective fuses 46 to terminal socket pins 250, 254, respectively. Again, voltage suppressors 44 and fuses 46 are removably received in circuit board 216 to permit the type of protection plug protector 210 provides to be selectively configured.

Cover 214 illustratively comprises a molded snap-on cover formed from a suitable plastic such as polyester valox DR48 15% glass fiber. An inwardly facing side 259 of cover 214 has an elongated rectangular opening which matches the elongated rectangular opening in the bight 211 of U-shaped body 212. Cover 214 has spring fingers 260 extending inwardly from opposite sides of side 259 which snap into grooves 262 formed in opposed sidewalls of body 212 to secure cover 214 to body 212. Grooves 262 also facilitate gripping of body 212. Cover 214 also has a closed side 261 opposite open side 259. The closed side 261 of cover 214 can have therein a hole 264 through which a wire 266 can pass when plug protector 210 is used as one end of a patch cord. Cover 214 would then include a conventional type of wire restraint (not shown) therein for holding wire 266 in place.

In the embodiment shown in FIGS. 8 and 9, plug protector 210 is configured to couple both the tip and ring wires of the communication line to the corresponding tip and ring circuits of the communication circuit. When plug protector 210 is inserted into a frame, post contact 226 of outer leg 218 will mate with the frame terminal to which the tip wire of the communication line is terminated and spring contact 230 of outer leg 218 will mate with the frame terminal to which the tip circuit of the communication circuit is terminated. Post contact 228 will mate with the frame terminal to which the ring wire of the communication line is terminated and spring contact 232 will mate with the frame terminal to which the ring circuit of the communication circuit is terminated. Spring contact 234 will mate with a frame ground terminal.

FIG. 11 shows in greater detail a post contact, such as post contacts 226, 228, coupled to a terminal pin, such as terminal pins 238, 246. Using post contact 226 and terminal pin 238 for purposes of reference, post contact 226 comprises a generally U-shaped metallic contact crimped together at the bight of the U to form a post 272. Post contact 226 also has formed therein a crimp connector (not shown) to which an end of a wire 274 is secured. Terminal pin 238 is affixed to a second end of wire 274.

FIG. 12 shows in greater detail a spring contact, such as spring contacts 230, 232, 234, coupled to a terminal pin, such as terminal pins 240, 242, 244. Using spring contact 230 and terminal pin 240 for purposes of reference, spring contact 230 comprises a spring metal contact partially folded back over on itself and having a crimp connector 268 formed in one end thereof. A wire 270 has one end connected to spring contact 230 by crimp connector 268 and a second end to which terminal pin 240 is affixed.

Although the invention has been described in detail with reference to certain preferred embodiments and specific examples, variations and modifications exist within the scope and spirit of the invention as described and as defined in the following claims.

What is claimed is:

1. A selectively configurable terminal connector for coupling or coupling and protecting, as selected, tip and ring circuits of an electronic communication circuit to tip and ring wires of a communication line, comprising a housing, a circuit board received in the housing, the circuit board having thereon a circuit including a plurality of circuit elements removably received in the circuit board, means for coupling the circuit to the tip and ring circuits of the electronic communication circuit and to the tip and ring wires of the communication line wherein the circuit couples or couples and protects, as selected, the communication line to the communication circuit, the circuit elements received in the circuit board selectable from among a plurality of circuit element types to configure the terminal connector for the selected coupling or protecting and coupling, and the circuit has at least one of the removable circuit elements couples in series between the tip circuit and tip wire and at least one of the removable circuit elements coupled in series between the ring circuit and ring wire.

2. The terminal connector of claim 1 wherein the tip circuit and the ring circuit are terminated at tip circuit and ring circuit terminals of a frame, the tip wire and ring wire are terminated at tip wire and ring wire terminals of the frame, the housing including first terminals which mate with the tip and ring circuit frame terminals and second terminals which mate with the tip and ring wire frame terminals when the terminal connector is plugged into the frame, the means for coupling the circuit board circuit to the electronic communication circuit and to the communication line comprising means for coupling the circuit board circuit to the first housing terminals and to the second housing terminals with the circuit elements connected therebetween.

3. The terminal connector of claim 2 wherein the housing further includes a ground terminal which mates with a ground terminal of the frame, and the removably received circuit elements include a solid state voltage suppressor coupled between one of the housing's first and second terminals and ground.

4. The terminal connector of claim 1 wherein the circuit elements coupled in series between the tip and ring circuits and the tip and ring wires are selected from a jumper wire and a current overload protection element.

5. The terminal connector of claim 1 wherein the housing includes a cover which snaps open and closed.

6. The terminal connector of claim 5 and further including a hinge for mounting the cover to the housing.

7. The terminal connector of claim 6 wherein the housing, cover and hinge comprise a one piece molded unit wherein the hinge comprises a living hinge.

8. The terminal connector of claim 3 wherein the housing includes a base having the housing's first, second and ground terminals extending therefrom, means for removably mounting the base to the housing wherein the base is selected from a plurality of bases having different configurations of terminal pins and terminal sockets extending therefrom.

9. The terminal connector of claim 1 wherein the communication circuit's tip circuit and a ring circuit are terminated at tip circuit and ring circuit terminals of a frame, the communication line's tip wire and a ring wire are terminated at tip wire and ring wire terminals of the frame, the housing including a tip circuit terminal, a ring circuit terminal, a tip wire terminal and a ring wire terminal, which mate with the tip circuit terminal, the ring circuit terminal, the tip wire terminal and the ring wire terminal, respectively, of the frame when the terminal connector is plugged into the frame, the circuit board circuit having a first leg for coupling or coupling and protecting, as selected, the tip wire to the tip circuit and a second leg for coupling or coupling and protecting, as selected, the ring wire to the ring circuit, and the means for coupling the circuit board circuit to the communication circuit and to the communication line comprises means for coupling the first leg of the circuit board circuit to the housing's tip circuit terminal and tip wire terminal with the circuit elements of the first leg of the circuit board circuit connected therebetween and means for coupling the second leg of the circuit board circuit to the housing's ring circuit terminal and ring wire terminal with the circuit elements of the second leg connected therebetween.

10. The terminal connector of claim 9 wherein the housing further includes a ground terminal which mates with a ground terminal of the frame, and the removably received circuit elements include a first solid state voltage suppressor coupled between one of the housing's tip circuit and tip wire terminals and ground, a second solid state voltage suppressor coupled between one of the housing's ring circuit and ring wire terminals and ground, a circuit element coupled in series between the housing's tip circuit and tip wire terminals and a circuit element coupled in series between the housing's ring circuit and ring wire terminals 11. The terminal connector of claim 10 wherein the circuit elements coupled in series between the housing's tip circuit and tip wire terminals and the housing's ring circuit and ring wire terminals are selected from jumper wires and current overload protection devices.

12. The terminal connector of claim 11 wherein the current overload protection devices comprise fuses.

13. The terminal connector of claim 10 wherein the housing includes a base having the housing's tip circuit, tip wire, ring circuit, ring wire, and ground terminals extending therefrom, and means for removably mounting the base to the housing wherein the base is selected from a plurality of bases having different configurations of terminal pins and terminal sockets extending therefrom.

14. The terminal connector of claim 13 wherein the means for removably mounting the base to the housing includes the housing having a distal end in which the base is received and a cover which snaps open and closed and secures the base in the housing when closed.

15. The terminal connector of claim 13 wherein the means for removably mounting the base to the housing includes the housing having a distal end in which the base is received, a cover which snaps open and closed, the cover securing the base in the housing when snapped closed, the base being freely removable from the housing when the cover is open.

16. The terminal connector of claim 15 wherein the housing, cover and hinge comprise a one piece molded unit wherein the hinge comprises a living hinge.

17. A selectably configurable terminal connector for a telecommunication system which has a frame and a switch, the frame having terminals at which tip and ring wires of communication lines are terminated and terminals at which tip and ring circuits of communication circuits in the switch are terminated, the terminal connector comprising:
    a housing having a base removably mounted thereto which has a plurality of terminals extending therefrom which mate with the tip and ring wire frame terminals of a communication line and the tip and ring circuit frame terminals of a communication circuit corresponding to the communication line;
    the housing including a cover which snaps open and closed and secures the base to the housing when closed;
    a circuit board received in the housing having a circuit, means for coupling the circuit board circuit to the base's terminals, the circuit including a plurality of circuit elements removably received in the circuit board wherein the base's terminal which mates with the frame's tip wire terminal is coupled to the base's terminal which mates with the frame's tip circuit terminal by at least one of the circuit elements and the base's terminal which mates with the frame's ring wire terminal is coupled to the base's terminal which mates with the frame's ring circuit terminal by at least one of the circuit elements;
    the circuit elements selectable from a plurality of circuit element types to configure the type of electrical protection provided by the terminal connector;
    the base selectable from among a plurality of bases having different configurations of terminals extending therefrom.

18. The terminal connector of claim 17 wherein the base further includes a ground terminal extending therefrom for mating with a terminal of the frame which is coupled to ground, the circuit board circuit including among its removable circuit elements a first solid state voltage suppressor which couples one of the base's terminals which are coupled to the tip circuit and tip wire frame terminals to ground and a second solid state voltage suppressor which couples one of the base's terminals which are coupled to the ring circuit and ring wire frame terminals to ground, the circuit elements which couple the base's terminals which mate with the frame's tip and ring wire terminals to the base's terminals which mate with the frame's tip and ring circuit terminals selectable from among current overload protection circuit elements and jumpers.

19. The terminal connector of claim 17 wherein the plurality of bases having different configurations of terminals extending therefrom include bases having different configurations of terminal pins extending therefrom to determine whether the circuit board circuit is coupled to frame terminals at which a communication line is terminated, frame terminals at which a communication circuit is terminated, or both.

20. The terminal connector of claim 19 wherein the plurality of bases having different configurations of terminals therefrom further include bases having different configurations of terminal sockets extending therefrom.

21. A selectably configurable terminal connector for a telecommunication system which has a frame, communication lines, and a switch, the frame having terminals at which communication lines are terminated and terminals at which communication circuits of the switch are terminated, the terminal connector comprising, a housing having a base removably mounted thereto which has a plurality of terminals extending therefrom which mate with corresponding terminals of the frame, an electrical circuit received within the housing having inputs coupled to the terminals of the base and outputs corresponding to the inputs, and means for coupling the inputs of the circuit to their corresponding outputs, the base selectable from among a plurality of bases having different configurations of terminals extending therefrom.

22. The terminal connector of claim 21 wherein the plurality of bases having different configurations of terminals extending therefrom include bases having different configurations of terminal pins extending therefrom to determine whether the circuit received within the housing is coupled to frame terminals at which a communication line is terminated, frame terminals at which a communication circuit is terminated, or both.

23. The terminal connector of claim 22 wherein the housing includes a cover that snaps open and closed and secures the base to the housing when closed.

24. The terminal connector of claim 23 wherein the housing further includes a hinge for mounting the cover to the housing.

25. The terminal connector of claim 23 wherein the electrical circuit includes removable circuit elements wherein at least one such circuit element couples each input to its corresponding output, the removable circuit elements selectable from among a plurality of types of circuit elements to permit the terminal connector to be selectively configured to provide varying degrees of electrical protection determined by which types of circuit elements are placed in the circuit.

26. The terminal connector of claim 24 wherein the inputs of the circuit in the housing, their corresponding outputs and the circuit elements which couple the inputs to their corresponding outputs comprise legs of the circuit, the circuit in the housing further including a solid state voltage suppressor for coupling each of its leg to ground, the circuit elements which couple the inputs of the circuit in the housing to their corresponding outputs selectable from among current overload protection circuit elements and jumpers.

* * * * *